(12) United States Patent
Höme et al.

(10) Patent No.: US 11,394,653 B2
(45) Date of Patent: Jul. 19, 2022

(54) DATA TRANSMISSION IN TIME-SENSITIVE DATA NETWORKS

(71) Applicant: SIEMENS AKTIENGESELLSCHAFT, Munich (DE)

(72) Inventors: Stephan Höme, Schwabach (DE); Marcel Kiessling, Bayern (DE); An Ninh Nguyen, Nuremberg (DE); Jürgen Schmitt, Fürth (DE); Frank Volkmann, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/045,139

(22) PCT Filed: Apr. 3, 2019

(86) PCT No.: PCT/EP2019/058364
§ 371 (c)(1),
(2) Date: Oct. 2, 2020

(87) PCT Pub. No.: WO2019/193031
PCT Pub. Date: Oct. 10, 2019

(65) Prior Publication Data
US 2021/0152482 A1 May 20, 2021

(30) Foreign Application Priority Data
Apr. 4, 2018 (DE) .................... 10 2018 205 013.9

(51) Int. Cl.
*H04L 12/859* (2013.01)
*H04L 12/841* (2013.01)
(Continued)

(52) U.S. Cl.
CPC .......... *H04L 47/2475* (2013.01); *H04L 47/28* (2013.01); *H04L 67/141* (2013.01)

(58) Field of Classification Search
CPC .... H04L 47/2475; H04L 47/28; H04L 67/141
(Continued)

(56) References Cited

U.S. PATENT DOCUMENTS 8,683,000 B1 * 3/2014 Schlansker ............. H04L 47/39
709/212
9,961,021 B2 * 5/2018 Chandrasekaran ..... H04L 49/70
(Continued)

FOREIGN PATENT DOCUMENTS

WO 2017092879 A1 6/2017
WO 2018024809 A1 2/2018

OTHER PUBLICATIONS

International Search Report and the Written Opinion for International Patent Application PCT/EP2019/058364 dated May 29, 2019.

*Primary Examiner* — Ruolei Zong
(74) *Attorney, Agent, or Firm* — Lempia Summerfield Katz LLC

(57) ABSTRACT

The invention describes a transmission device having a (TCP/IP) protocol stack (S, S'), which is designed for the transmission of data (D) in a time-sensitive network (TSN). The transmission device comprises at least one TSN-compliant virtual Ethernet interface (2.2, 2.2') and an associated TSN control unit (3.1, 3.1'). The at least one TSN-compliant virtual Ethernet interface (2.2, 2.2') is designed to send and/or receive a TSN-compliant data stream (2.1, 2.1') in a physical layer (1) of the TCP/IP protocol stack (S, S'). The TSN-compliant data stream (2.1, 2.1') can be configured and/or parameterised by means of the associated TSN control unit (3.1, 3.1').

14 Claims, 3 Drawing Sheets

(51) Int. Cl.
*H04L 29/08* (2006.01)
*H04L 47/2475* (2022.01)
*H04L 47/28* (2022.01)
*H04L 67/141* (2022.01)

(58) Field of Classification Search
USPC .......................................................... 370/230
See application file for complete search history.

(56) References Cited

U.S. PATENT DOCUMENTS

| | | |
|---|---|---|
| 11,063,884 B2 * | 7/2021 | Ganga ................... H04L 1/1621 |
| 2013/0173810 A1 * | 7/2013 | Subramaniam ....... G06F 15/161 |
| | | 709/227 |
| 2018/0006955 A1 * | 1/2018 | Bush ................... H04L 41/0896 |
| 2018/0024537 A1 | 1/2018 | Chauvet |
| 2018/0321662 A1 * | 11/2018 | Nixon ................... G06F 13/364 |
| 2019/0149475 A1 * | 5/2019 | Martin ..................... H04L 47/12 |
| | | 370/235 |
| 2019/0253339 A1 * | 8/2019 | Mehmedagic ...... H04L 45/3065 |
| 2020/0259755 A1 * | 8/2020 | Wang ..................... H04L 47/283 |
| 2020/0389405 A1 * | 12/2020 | Mardmoeller .......... H04L 47/56 |

* cited by examiner

DATA TRANSMISSION IN TIME-SENSITIVE DATA NETWORKS

CROSS REFERENCE TO RELATED APPLICATIONS

This present patent document is a § 371 nationalization of PCT Application Serial Number PCT/EP2019/058364 filed Apr. 3, 2019, designating the United States, which is hereby incorporated in its entirety by reference. This patent document also claims the benefit of DE 102018205013.9 filed on Apr. 4, 2018 which is also hereby incorporated in its entirety by reference.

FIELD

Embodiments relate to an apparatus for transmitting data in time-sensitive networks (time-sensitive networking (TSN) networks) and in networks with guaranteed quality parameters (quality of service (QoS) networks).

BACKGROUND

Time-sensitive networking (TSN) denotes a group of communication standards that was developed by the standardization organization IEEE 802.1 of the Institute of Electrical and Electronics Engineers (IEEE) predominantly for layer 2, also referred to as the data link layer, of the Open Systems Interconnection (OSI) reference model for network protocols. The OSI reference model includes seven layers for data transmission in the association that follows with the English designations:

| Layer 7 | application layer |
| --- | --- |
| Layer 6 | presentation layer |
| Layer 5 | session layer |
| Layer 4 | transport layer |
| Layer 3 | network layer |
| Layer 2 | data link layer |
| Layer 1 | physical layer |

The OSI reference model may be implemented with a TCP/IP protocol stack (TCP/IP stack) in which the network layer transmits data in packet-switched fashion in accordance with the Internet Protocol (IP), data packets are compiled in the transport layer according to the Transmission Control Protocol (TCP) and in which a software application, or application, may extend over layers 5 to 7.

TSN protocols extend known mechanisms for data transmission in accordance with the OSI reference model for example by functions for reserving transmission bandwidth, for synchronization of timing or for minimizing transmission latencies between the endpoints of a TSN protocol. Such extensions are summarized as quality of service (QoS).

Without QoS extensions, the timing response for the data transmission by a layer architecture in which the data link layer is implemented in line with the Ethernet protocol cannot be predicted reliably. Similarly, the transmission behavior of applications that transmit data within one or more layers above layer 4 (transport layer) in a network architecture implemented in accordance with the OSI reference model without QoS extensions is not known and not adjustable to the parameters of the network architecture, for example to an available transmission bandwidth.

An implementation of the data link layer that has been known from the prior art for a long time is the Ethernet transmission protocol. The services of the Ethernet transmission protocol are made available for layers 3 to 7 situated above by an Ethernet interface.

To implement a time-sensitive network transmission (TSN), the Ethernet transmission protocol may be provided with extensions. Such extensions are provided for higher layers of the OSI reference model via TSN-compatible Ethernet interfaces.

The prior art discloses TSN-compatible Ethernet interfaces that are arranged in layer 2 of the OSI reference model and that, in addition to functions of the Ethernet transmission protocol, provide for controlling the timing response of the transmission of data packets. By way of example, stream classes for temporal structuring, prioritization and for guaranteeing latencies within a TSN network may be determined by parameters. Furthermore, admissible transmission times for an application may be parameterized as transmission offsets.

Although an application, referred to as a legacy application below, that was configured for accessing a non-TSN-compatible Ethernet interface may access the services of the Ethernet transmission protocol that are provided by a TSN-compatible Ethernet interface, it cannot access the additionally provided systems for controlling the timing response of the transmission. The transmission behavior of such an application cannot be controlled on the basis of the transmission bandwidth and/or on the basis of temporal transmission parameters, for example associated transmission intervals. Such control is required for the operation of a time-sensitive network, however, on account of the limited overall transmission bandwidth.

Based on the prior art, applications, and TSN extensions, or QoS extensions in general, that are provided by a TSN-compatible Ethernet interface therefore need to use the specific data and/or programming interface of a TSN-compatible Ethernet interface of this kind. Otherwise, it is not possible to provide temporal transmission guarantees for such a legacy application even within a TSN network.

An application provided for an Ethernet interface without TSN extensions therefore needs to be adapted, as a rule at least recompiled and/or connected (linked) to programming libraries.

Furthermore, the prior art discloses virtual local area networks (VLANs) that may be used within a single physical network (that is to say: a network connected via a joint physical layer of the OSI reference model) to physically and/or topologically separate subnetworks such that the transmission of data may be restricted to a respective subnetwork (VLAN). Such VLANs are described in the IEEE 802.1Q-2011 standard IEEE Standard for Local and Metropolitan Area Networks—Bridges and Bridged Networks.

Access to such a VLAN is effected through a virtual network interface, for example through a virtual Ethernet interface. A virtual Ethernet interface provides all the functions of a conventional, non-TSN-compatible Ethernet interface, but may be implemented by an operating system, independently of a physical Ethernet adapter. Multiple virtual Ethernet interfaces may be parameterized independently of one another and assigned to separate VLANs, but may access a joint physical Ethernet adapter.

The provision of temporal and/or QoS transmission guarantees is not provided for by virtual network interfaces.

BRIEF DESCRIPTION

The scope of the present invention is defined solely by the appended claims and is not affected to any degree by the statements within this summary. The present embodiments may obviate one or more of the drawbacks or limitations in the related art.

Embodiments provide a transmission apparatus that allows applications to interchange data via time-sensitive networks more easily and in a better manner.

A transmission apparatus configured to transmit data in a time-sensitive network (TSN) by a Transmission Control Protocol/Internet Protocol (TCP/IP) protocol stack includes at least one virtual Ethernet interface configured to transmit data in a physical layer of the TCP/IP stack via a physical Ethernet adapter in accordance with a protocol that may be used to guarantee temporal parameters for the data transmission (time-sensitive network, TSN) and/or that may be used to guarantee other quality parameters for the data transmission (quality of service, QoS). Such a data transmission is referred to as a TSN-compliant data transmission or as a TSN-compliant data stream.

In an embodiment, the virtual Ethernet interface is configured for data interchange with an application via the IP layer of the TCP/IP protocol stack such that no control data or parameters that are specific to the data transmission in a TSN network or to a QoS data transmission are interchanged with an application via the IP layer. A virtual Ethernet interface therefore behaves toward and appears to an application as an Ethernet interface without TSN (or QoS) functions.

A virtual Ethernet interface may be referred to as a TSN-compliant virtual Ethernet interface below.

The transmission apparatus further includes at least one TSN control unit. Each TSN-compliant virtual Ethernet interface includes an associated TSN control unit. A TSN control unit is configured, and connected to the associated TSN-compliant virtual Ethernet interface, such that the TSN-compliant virtual Ethernet interface is configurable and/or parameterizable by the TSN control unit. By way of example, stream classes for a data stream transmitted via the TSN-compliant virtual interface may be configured, that determine the temporal structuring, the prioritization, or guaranteed latencies within the TSN network. Additionally, or alternatively, admissible transmission times may be parameterized as transmission offsets.

A TSN control unit may be implemented by resources of an operating system, for example.

An advantage of the described transmission apparatus with a virtual TSN-compliant Ethernet interface is the opportunity for legacy applications that do not support a transmission of TSN and/or QoS parameters via the IP layer and that, for example for technical, legal, regulatory and/or outlay reasons, are not adjustable for the transmission of such parameters via the IP layer to be operated in a TSN network in an unchanged manner, flexibly and with little outlay for integration.

In an embodiment, the transmission apparatus includes a plurality of virtual TSN-compliant Ethernet interfaces that are configurable and/or parameterizable independently by a respective associated TSN control unit. Each of the virtual TSN-compliant Ethernet interfaces is connectable to at least one respective application via the IP layer. Moreover, multiple of the TSN-compliant virtual Ethernet interfaces are connectable to a single, joint physical Ethernet adapter for the purpose of TSN-compliant data transmission in the physical layer.

The transmission bandwidth of a single physical Ethernet adapter may be used by a plurality of applications. The outlay for a TSN-compliant data transmission is therefore reduced.

In an embodiment, a virtual TSN-compliant Ethernet interface is in a form connectable to a plurality of applications. An advantage is that configuration and/or parameterization of a single virtual TSN-compliant Ethernet interface provides for the TSN-compliant data transmission of a plurality of applications to be controlled. The outlay for setting up a TSN-compliant data transmission is therefore reduced.

A terminal includes a computing unit and resources that are configured to implement at least one TCP/IP protocol stack, for example an operating system executable on the computing unit. The terminal further includes a transmission apparatus in one of the embodiments described above. The computing unit and the resources are configured for flow control for at least one application and wherein the transmission apparatus is connectable to the application and configured to interchange data with the application via an IP layer of the at least one TCP/IP protocol stack.

Such a terminal may be set up by the TSN control unit, for example using an operating system, for use in a TSN-compliant network or for use in a network having QoS parameters, without requiring adjustments to the applications executable on the terminal. This allows efforts in the development, testing, licensing, and marketing of such terminals to be saved and a development risk to be reduced. It is also possible to adjust a terminal for a TSN-compliant network while observing any legal, contractual, or regulatory restrictions in respect of one or more applications.

A method for operating such a terminal involves an application transmission bandwidth requirement ascertained for each application and each application assigned a virtual TSN-compliant Ethernet interface. The TSN control unit is used to configure and parameterize the virtual TSN-compliant Ethernet interface to transmit at least the application transmission bandwidth of the associated application.

An advantage is that applications that are not intended for use in a TSN network or in a network having QoS parameter guarantees may be integrated into such a TSN or QoS network without change, for example without recompilation, such that the network-wide quality and time guarantees are observed. Further advantages of the method arise from the advantages of the terminal operated therewith.

In an embodiment, an application transmission bandwidth is limited by shaping in at least one virtual TSN-compliant Ethernet interface such that the sum of all application transmission bandwidths of the applications associated with the virtual TSN-compliant Ethernet interface does not exceed a physically available transmission bandwidth. It is thus simple to provide the observance of network-wide quality and time guarantees even for noncooperative legacy applications.

In an embodiment, a virtual TSN-compliant Ethernet interface is assigned multiple applications. The transmission bandwidth physically available in line with the transmission bandwidth of the associated physical Ethernet adapter is split over the associated application transmission bandwidths statically. This results in an upper limit for the number of applications controllable using the virtual TSN-compliant Ethernet interface. It is thus advantageously possible to use a physical transmission bandwidth for a TSN-compliant data transmission efficiently.

In an embodiment, a virtual TSN-compliant Ethernet interface is assigned multiple applications and a physically available transmission bandwidth is split over the associated applications dynamically. This is advantageous for example if multiple applications include individual bandwidth requirements that fluctuate over time but, in total, complement one another to form an approximately constant overall bandwidth requirement. It is possible to use a physical transmission bandwidth for a TSN-compliant data transmission efficiently.

In an embodiment, data are transmitted between an application and the associated virtual TSN-compliant Ethernet interface in accordance with the Transmission Control Protocol (TCP). At least one parameter of the TCP protocol is used to convey to the application an indication of the application transmission bandwidth available to the application. By way of example, such an indication may be conveyed to the application using the TCP parameter TCP Receive Window (RWin).

An advantage is that an application may adjust its transmission behavior in line with the available application transmission bandwidth without using TSN-specific mechanisms. An application may therefore be developed and used more universally.

DETAILED DESCRIPTION

Figure 1:
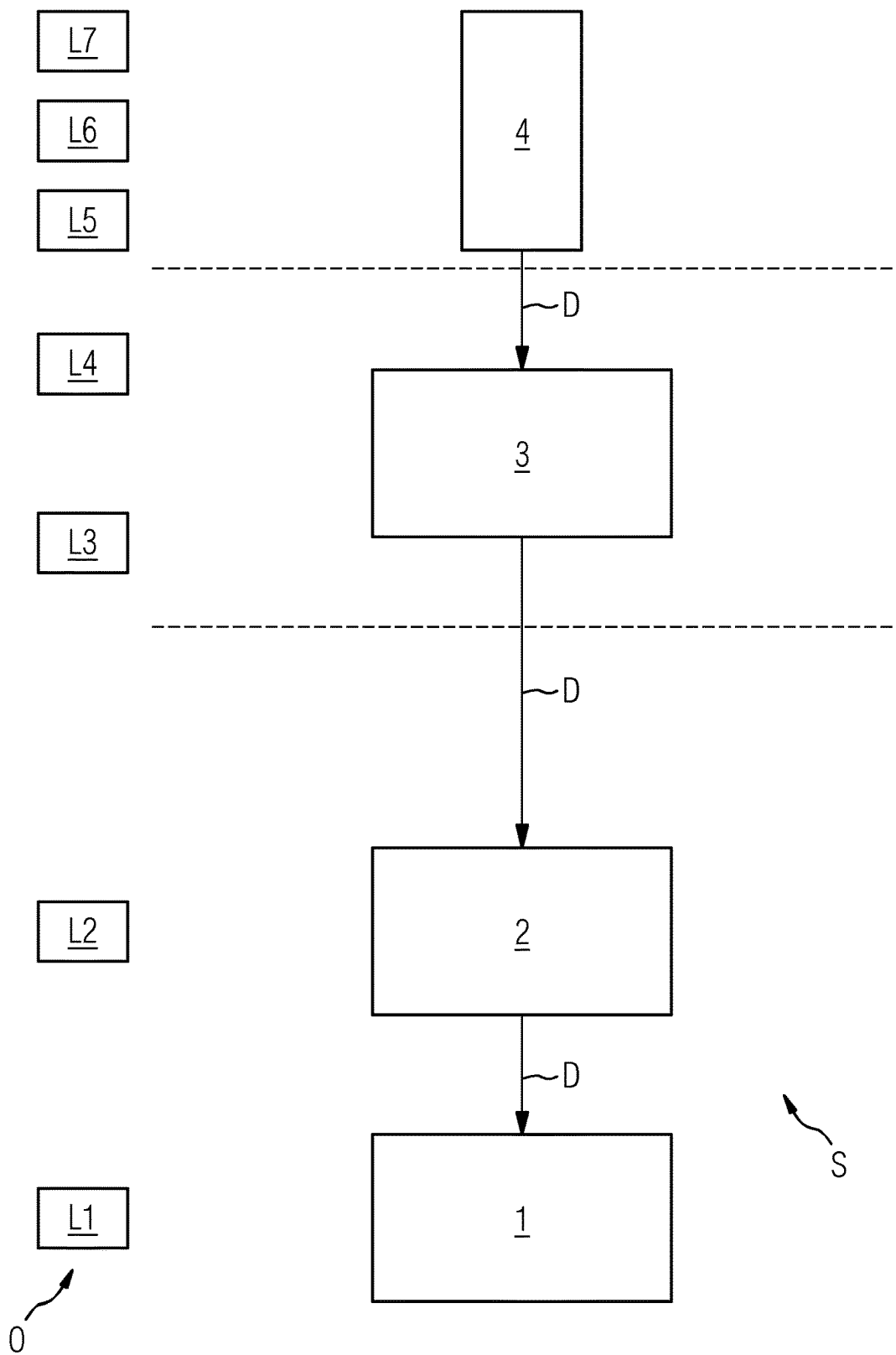
FIG. 1 schematically depicts a TCP/IP protocol stack without QoS extensions in accordance with the prior art.

FIG. 1 schematically depicts the implementation of the OSI reference model O by a TCP/IP protocol stack S on a terminal, not depicted in more detail, in accordance with the prior art.

According to the OSI reference model, a first to seventh OSI transmission layer L1 to L7 are arranged above one another and associated with layers 1 to 4 of a TCP/IP protocol stack S, wherein a physical layer 1 is associated with the first OSI transmission layer or OSI physical layer L1, an Ethernet layer 2 is associated with the second OSI transmission layer or OSI data link layer L2, an IP layer 3 is associated with the third OSI transmission layer or OSI network layer L3 and an application layer 4 extends over the fifth to seventh OSI transmission layers (OSI session layer L5, OSI presentation layer L6, OSI application layer L7).

The fourth OSI transmission layer or OSI transport layer L4 may be implemented in the TCP/IP protocol stack S by a transport layer, that is not depicted in more detail.

Data D are transmitted in each case between vertically adjoining layers 1 to 4.

The data D may include payload data that are transmitted horizontally within the respective layer 1 to 4 between different terminals. A respective layer 1 to 4 of a receiving terminal receives and processes those payload data that have been provided by the corresponding, identically numbered layer 1 to 4 of a sending terminal.

The data D may further include control data that may be used to influence the transmission behavior of a vertically lower-down layer 1 to 3 of the TCP/IP protocol stack S.

Figure 2:
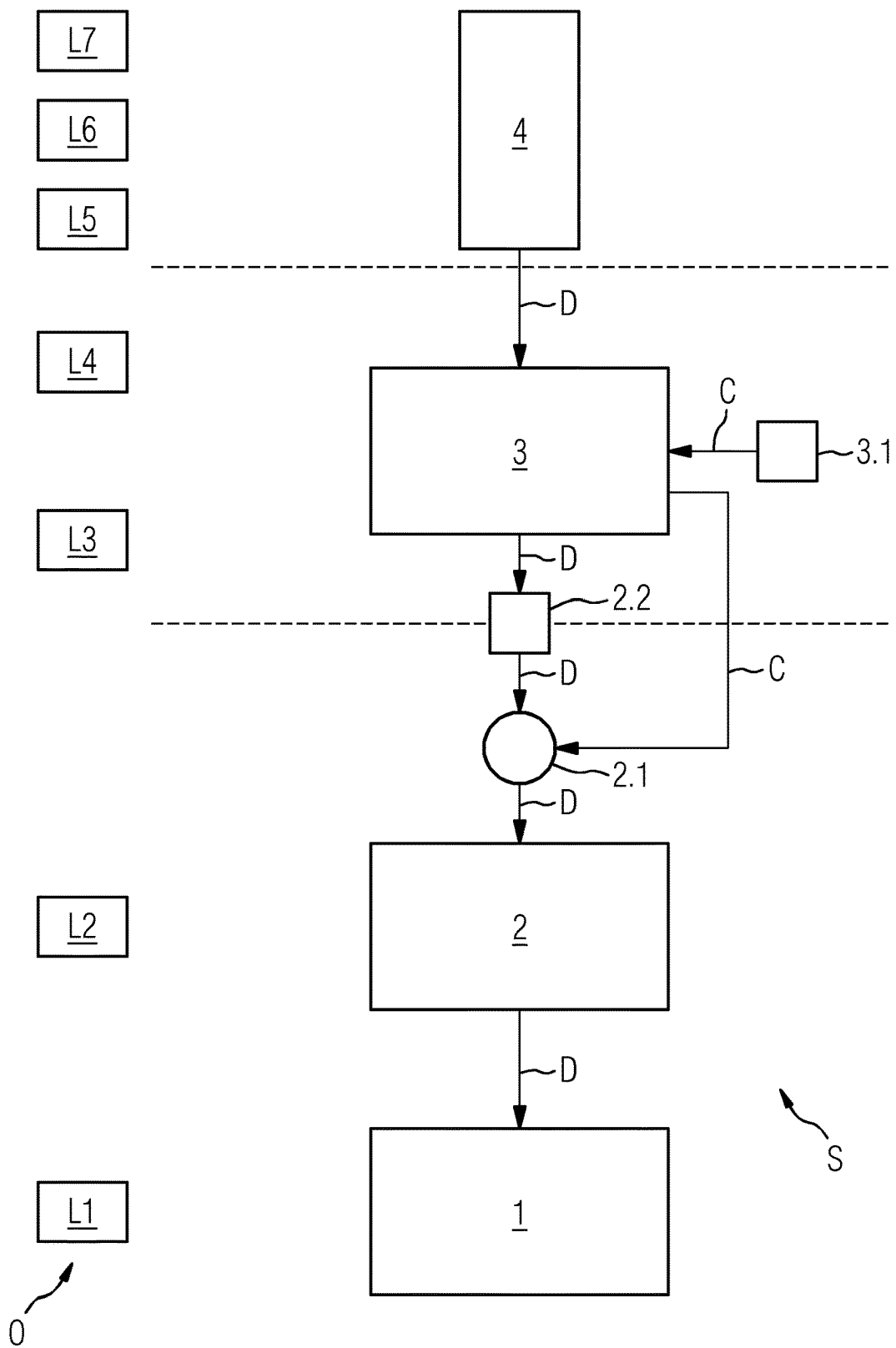
FIG. 2 schematically depicts a TCP/IP protocol stack with a TSN-compliant virtual Ethernet interface according to an embodiment.

The direction of action of the control data is indicated by arrows in FIG. 2. Payload data are transmitted bidirectionally between vertically adjacent layers 1 to 4.

FIG. 2 schematically depicts the implementation of the OSI reference model O by a TCP/IP protocol stack S. In contrast to the prior art, a TSN-compliant virtual Ethernet interface 2.2 is additionally arranged between the Ethernet layer 2 and the IP layer 3. The virtual Ethernet interface 2.2 is configured to generate and process a TSN-compliant data stream 2.1 that transmits the data D to/from the Ethernet layer 2.

The virtual Ethernet interface 2.2 is configurable and parameterizable by TSN control data C. The TSN control data C include parameters for determining TSN stream classes that may be used to stipulate for example a temporal structuring, a prioritization and/or guaranteed latencies for the TSN-compliant data stream 2.1. The TSN control data C may moreover include transmission offsets that stipulate at least one transmission time for the TSN-compliant data stream 2.1.

The configuration and/or parameterization of the virtual Ethernet interface 2.2 is effected by a TSN control unit 3.1, that feeds the TSN control data C into the IP layer 3 of the TCP/IP protocol stack S. The direction of action of the TSN control data C is marked by arrows in FIG. 2. However, it is also possible for information to be transmitted contrary to the arrow direction, for example in the case of a handshake protocol for transmitting the TSN control data C.

The TCP/IP protocol stack S extended by a virtual TSN-compliant Ethernet interface 2.2 as depicted in FIG. 2 provides for a legacy application to communicate via a time-sensitive TSN network in the application layer 4 without change. All of the time-critical transmission parameters and QoS quality parameters are controlled by the TSN control unit 3.1, that is independent of the legacy application.

The overall TSN communication remains transparent for the legacy application, since only the IP layer 3, that is unchanged in comparison with a non-TSN-compliant transmission, is accessed from the application layer 4. The network interfaces are selected using known mechanisms that are unchanged in comparison with a TCP/IP protocol stack from the prior art, for example by stipulating the routing using the protocol of the IP layer 3 and/or by stipulating the virtual Ethernet interface using the protocol of the Ethernet layer 2.

By way of example, necessary limiting of the transmission bandwidth of the legacy application may be effected by shaping in the virtual Ethernet interface 2.2, without the legacy application requiring information about the bandwidth upper limit for this purpose. However, it is possible to use control and monitoring information transmitted with the data D to indirectly convey information concerning the usable transmission bandwidth to the legacy application, for example using the parameter of the window size when the TCP protocol is used in a transport layer, not depicted in more detail, that corresponds to the OSI transport layer L4.

An advantage of the TCP/IP protocol stack S extended by a virtual TSN-compliant Ethernet interface 2.2 is the opportunity for legacy applications that, for example for technical, legal, regulatory and/or outlay reasons, are not adjustable for a TSN-compliant data transmission in the IP layer 3 to be operated in a TSN network in an unchanged manner.

Figure 3:
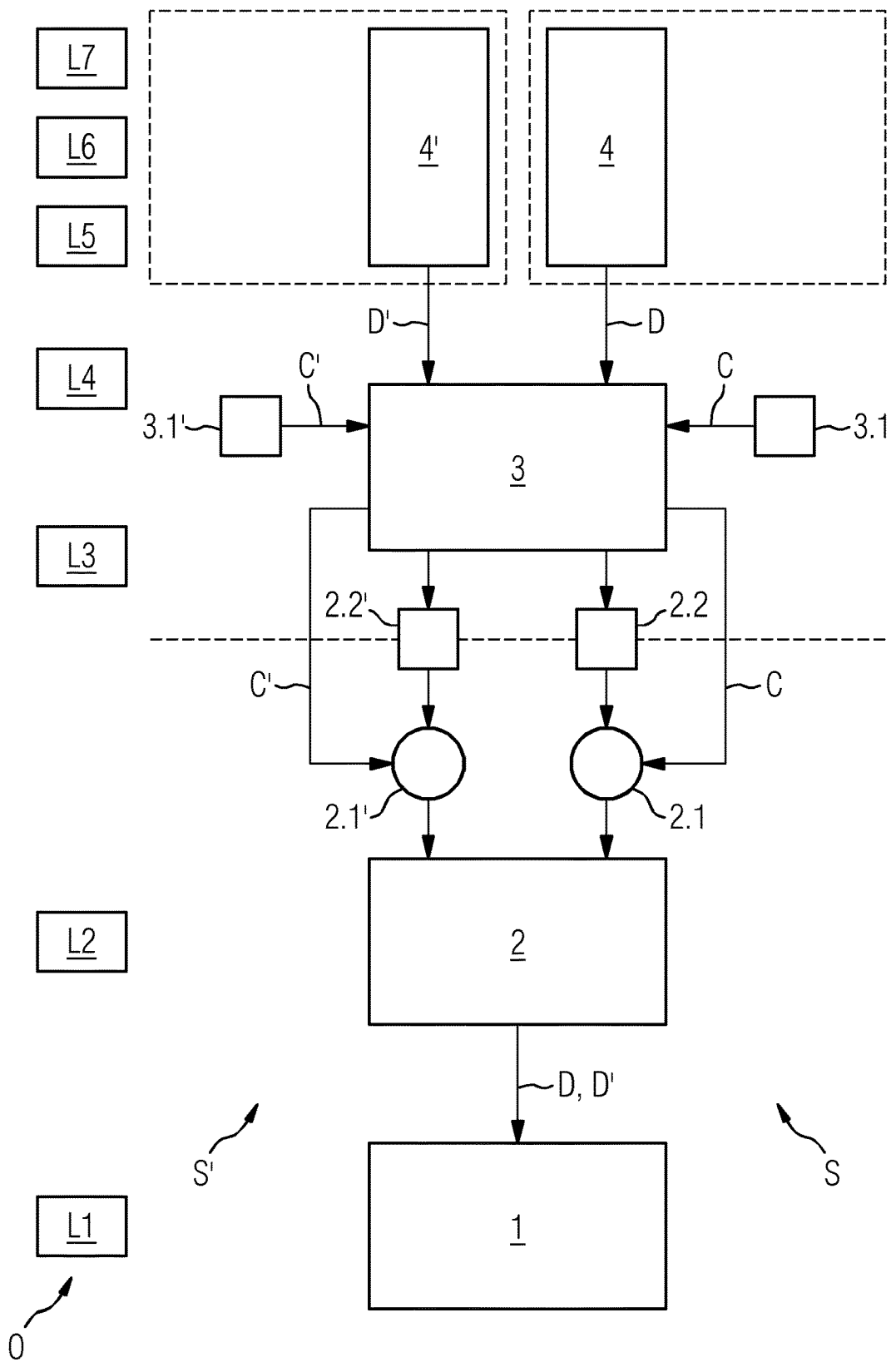
FIG. 3 schematically depicts a TCP/IP protocol stack with two TSN-compliant virtual Ethernet interfaces according to an embodiment.

FIG. 3 schematically depicts two instances of a TCP/IP protocol stack S, S' in an embodiment with two mutually separate legacy applications that each run in an instance of the application layer 4, 4'. In other words, the two programs run independently of one another on a terminal and interchange data with one another or with other programs on the same or a different terminal along the fifth to seventh OSI transmission layers.

The first instance of the application layer 4 transmits first data D to/from the IP layer 3. The routing of the IP layer 3 is configured such that the first data D are routed to the first virtual Ethernet interface 2.2. The first virtual Ethernet interface 2.2 is configured to generate and process a first TSN-compliant data stream 2.1 that transmits the first data D to/from the Ethernet layer 2.

The first virtual Ethernet interface 2.2 is configurable and parameterizable by first TSN control data C analogously to the method explained using FIG. 2. The configuration and/or parameterization of the first virtual Ethernet interface 2.2 is effected by a first TSN control unit 3.1, that feeds the first TSN control data C into the IP layer 3 of the TCP/IP protocol stack S.

Layers 1 to 3, the first instance of the application layer 4, the first virtual Ethernet interface 2.2 and the first TSN control unit 3.1 therefore separately form a TCP/IP protocol stack S in accordance with the embodiment described in FIG. 2.

Analogously, layers 1 to 3, the second instance of the application layer 4', a second virtual Ethernet interface 2.2' and a second TSN control unit 3.1' separately form a second TCP/IP protocol stack S' in accordance with the embodiment in FIG. 2. The second virtual Ethernet interface 2.2' is configured to generate and process a second TSN-compliant data stream 2.1' and is configurable and parameterizable by second TSN control data C' analogously to the method already explained in FIG. 2, and the configuration and/or parameterization of the second virtual Ethernet interface 2.2' is effected by the second TSN control unit 3.1', that feeds the second TSN control data C' into the IP layer 3 of the TCP/IP protocol stack S'.

Both instances of the application layer 4, 4' jointly use the physical layer 1, the Ethernet layer 2 and the IP layer 3, but access mutually separate virtual Ethernet interfaces 2.2, 2.2', that are in TSN-compliant form and configurable and parameterizable by respective associated TSN control units 3.1, 3.1' and use a joint physical Ethernet adapter, not depicted in more detail, to access the physical layer 1.

It is therefore possible to assign a TSN-compliant transmission to each of the legacy applications running in the instances of the application layer 4, 4' by virtue of each of the virtual Ethernet interfaces 2.2, 2.2' being configured and parameterized such that the sum of the individual transmission bandwidths allocated to the virtual Ethernet interfaces 2.2, 2.2' is no greater than the total bandwidth transmittable via the first to third layers 1 to 3 and that also each virtual Ethernet interface 2.2, 2.2' is allocated an individual transmission bandwidth that is at least as great as the bandwidth requirement of the legacy application running in the respective instance of the application layer 4, 4'.

A plurality of legacy applications may therefore communicate via a time-sensitive (TSN) network without adjustment and may guarantee temporal assurances concerning transmission behavior.

In an embodiment, further legacy applications, not depicted in FIG. 3, may be operated in further instances of the application layer and may be jointly assigned to a TSN-compliant virtual Ethernet interface 2.2, 2.2'.

The transmission bandwidth allocated to the virtual Ethernet interface 2.2, 2.2' may be split over the associated legacy applications in a manner that does not vary over time (statically), for example in equal proportions. However, it is also possible for the transmission bandwidth allocated to the respective virtual Ethernet interface 2.2, 2.2' to be split over the associated legacy applications in proportions that vary over time (dynamically).

An advantage is that the operation of a prescribed number of applications requires a smaller number of virtual Ethernet interfaces 2.2, 2.2'. The outlay for installation and maintenance may therefore be reduced and the data throughput increased.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A transmission apparatus including a Transmission Control Protocol/Internet Protocol (TCP/IP) protocol stack, the transmission apparatus configured to transmit data in a time-sensitive network (TSN), the transmission apparatus comprising:
   at least one TSN-compliant virtual Ethernet interface, the at least one TSN-compliant virtual Ethernet interface configured to send, receive, or send and receive a TSN-compliant data stream in a physical layer of the TCP/IP protocol stack; and
   an associated TSN controller configured to configure, parameterize, or configure and parameterize the TSN-compliant data stream, wherein the TSN controller is set up and connected to an associated TSN-compliant virtual Ethernet interface in such a way that TSN stream classes are configured for a data stream transmitted via the TSN-compliant virtual Ethernet interface and the TSN stream classes determine at least one of temporal structuring, prioritization, or guaranteed latency times within the time sensitive network.

2. The transmission apparatus of claim 1, further comprising:
   a plurality of virtual TSN-compliant Ethernet interfaces that are configured, parameterized, or configured and parameterized independently by a respective associated TSN controller, that are connectable to at least one respective application running in an instance of an application layer via an IP layer of the TCP/IP protocol stack and that are connectable to the physical layer of the TCP/IP protocol stack-jointly via a physical Ethernet adapter.

3. The transmission apparatus of claim 1, wherein at least one virtual TSN-compliant Ethernet interface is configured to connect to a plurality of applications.

4. A terminal comprising:
   a computing unit configured to implement at least one TCP/IP protocol stack; and
   a transmission apparatus comprising:
     at least one time sensitive network (TSN) compliant virtual Ethernet interface, the at least one TSN-compliant virtual Ethernet interface configured to send, receive, or send and receive TSN-compliant data stream in a physical layer of the at least one TCP/IP protocol stack; and an associated TSN controller configured to configure, parameterize, or configure and parameterize the TSN-compliant data stream, wherein the TSN controller is set up and connected to an associated TSN-compliant virtual Ethernet interface in such a way that TSN stream classes are configured for a data stream transmitted via the TSN-compliant virtual Ethernet interface and the TSN stream classes determine at least one of temporal structuring, prioritization, or guaranteed latency times within the time sensitive network;

wherein the computing unit is configured for flow control for at least one application and wherein the transmission apparatus is configured to connect the at least one application and configured to interchange data with the at least one application via an IP layer of the at least one TCP/IP protocol stack.

5. The terminal of claim 4, wherein an application transmission bandwidth requirement is ascertained for each application, each application is assigned a respective virtual TSN-compliant Ethernet interface and the respective virtual TSN-compliant Ethernet interface is configured and parameterized by the TSN controller to transmit at least the application transmission bandwidth requirement of an associated application.

6. The Terminal of claim 5, wherein an application transmission bandwidth is limited by shaping in a respective virtual TSN-compliant Ethernet interface such that a sum of all application transmission bandwidths of applications associated with the respective virtual TSN-compliant Ethernet interface does not exceed a physically available transmission bandwidth.

7. The Terminal of claim 5, wherein the at least one virtual TSN-compliant Ethernet interface is assigned multiple applications and a physically available transmission bandwidth is split over the associated application transmission bandwidths statically.

8. The Terminal of claim 5, wherein the at least one virtual TSN-compliant Ethernet interface is assigned multiple applications and a physically available transmission bandwidth is split over associated application transmission bandwidths dynamically.

9. The Terminal of claim 5, wherein data are transmitted between an application and the associated virtual TSN-compliant Ethernet interface in accordance with Transmission Control Protocol (TCP) and wherein at least one parameter of the TCP protocol is used to convey to the application an indication of available application transmission bandwidth.

10. A method for operating a terminal, the terminal comprising a computing unit configured to implement at least one TCP/IP protocol stack and a transmission apparatus comprising: at least one time sensitive network (TSN) compliant virtual Ethernet interface, the at least one TSN-compliant virtual Ethernet interface configured to send, receive, or send and receive a TSN-compliant data stream in a physical layer of the at least one TCP/IP protocol stack and an associated TSN controller configured to configure, parameterize, or configure and parameterize the TSN-compliant data stream; wherein the computing unit is configured for flow control for at least one application and wherein the transmission apparatus is configured to connect to the at least one application and configured to interchange data with the at least one application via an IP layer of the at least one TCP/IP protocol stack, the method comprising:

ascertaining an application transmission bandwidth requirement for each application;

assigning each application a respective virtual TSN-compliant Ethernet interface; and configuring and parameterizing the respective virtual TSN-compliant Ethernet interface by the associated TSN controller to transmit at least the application transmission bandwidth requirement of an associated application, wherein the TSN controller is set up and connected to an associated TSN-compliant virtual Ethernet interface in such a way that TSN stream classes are configured for a data stream transmitted via the TSN-compliant virtual Ethernet interface and the TSN stream classes determine at least one of temporal structuring, prioritization, or guaranteed latency times within the time sensitive network.

11. The method of claim 10, wherein an application transmission bandwidth is limited by shaping in a respective virtual TSN-compliant Ethernet interface such that a sum of all application transmission bandwidths of applications associated with the respective virtual TSN-compliant Ethernet interface does not exceed a physically available transmission bandwidth.

12. The method of claim 10, wherein the at least one virtual TSN-compliant Ethernet interface is assigned multiple applications and a physically available transmission bandwidth is split over the associated application transmission bandwidths statically.

13. The method of claim 10, wherein the at least one virtual TSN-compliant Ethernet interface is assigned multiple applications and a physically available transmission bandwidth is split over associated application transmission bandwidths dynamically.

14. The method of claim 10, wherein data are transmitted between an application and the associated virtual TSN-compliant Ethernet interface in accordance with Transmission Control Protocol (TCP) and wherein at least one parameter of the TCP protocol is used to convey to the application an indication of the available application transmission bandwidth.

* * * * *